United States Patent
Murtfeldt et al.

(10) Patent No.: US 11,525,297 B2
(45) Date of Patent: Dec. 13, 2022

(54) INTEGRATED WINDOW REGULATOR AND METHOD OF MAKING THE SAME

(71) Applicant: Brose Fahrzeugteile SE & Co. Kommanditgesellschaft, Bamberg, Bamberg (DE)

(72) Inventors: Jeffrey Murtfeldt, Bloomfield Hills, MI (US); David Smith, Lake Orion, MI (US); Timothy Bellamy, Oxford, MI (US)

(73) Assignee: Brose Fahrzeugteile SE & Co. Kommanditgesellschaft, Bamberg, Bamberg (DE)

( * ) Notice: Subject to any disclaimer, the term of this patent is extended or adjusted under 35 U.S.C. 154(b) by 56 days.

(21) Appl. No.: 16/917,305

(22) Filed: Jun. 30, 2020

(65) Prior Publication Data

US 2021/0404240 A1    Dec. 30, 2021

(51) Int. Cl.
*B60J 5/04* (2006.01)
*E05F 15/689* (2015.01)
*B60J 1/17* (2006.01)

(52) U.S. Cl.
CPC .............. *E05F 15/689* (2015.01); *B60J 1/17* (2013.01); *E05Y 2201/684* (2013.01); *E05Y 2201/708* (2013.01); *E05Y 2600/61* (2013.01); *E05Y 2800/12* (2013.01); *E05Y 2800/46* (2013.01); *E05Y 2900/55* (2013.01)

(58) Field of Classification Search
CPC .... B60J 1/17; B60J 1/14; E05F 11/382; E05F 11/385; E05F 11/488; E05F 11/486; E05F 11/485; E05F 15/689; E05Y 2900/55; E05Y 2201/612; E05Y 2201/64; E05Y 2201/654; E05Y 2201/684; E05Y 2201/708; E05Y 2600/61; E05Y 2800/12; E05Y 2800/46
USPC .......... 49/414, 375, 374, 349, 340, 352, 416, 49/332
See application file for complete search history.

(56) References Cited

U.S. PATENT DOCUMENTS

| | | | |
|---|---|---|---|
| 6,732,474 B1 * | 5/2004 | Eck .................. | B60J 5/0416 49/502 |
| 9,511,652 B2 * | 12/2016 | Barr .................. | B60J 5/0416 |
| 10,603,990 B2 | 3/2020 | Hümmer et al. | |
| 10,669,764 B2 * | 6/2020 | Fortin ................ | E05D 15/165 |
| 11,065,945 B2 * | 7/2021 | Martino ............ | B60J 5/0427 |

(Continued)

FOREIGN PATENT DOCUMENTS

| DE | 102018202473 A1 | 8/2019 |
|---|---|---|
| EP | 3138986 A1 | 3/2017 |

(Continued)

*Primary Examiner* — Chi Q Nguyen
(74) *Attorney, Agent, or Firm* — Brooks Kushman P.C.

(57) ABSTRACT

A window regulator including a panel and a guide rail. The panel may define a speaker aperture that may be configured to receive at least a portion of the speaker. The guide rail may be integrally formed to the panel and configured to carry a slider. The slider may be configured to move along the guide rail to move the window between a first position and a second position. The guide rail may include an aperture-region portion that may extend across the speaker aperture in a first direction. The aperture-region portion may include a first sidewall and a second sidewall that may each extend in a second direction that may be substantially orthogonal to the first direction.

20 Claims, 5 Drawing Sheets

(56) References Cited

U.S. PATENT DOCUMENTS

| | | | |
|---|---|---|---|
| 2001/0017472 A1* | 8/2001 | Nishikawa | B60J 5/0416 292/262 |
| 2004/0128917 A1* | 7/2004 | Lin | B60J 5/0416 49/502 |
| 2004/0155483 A1* | 8/2004 | Lin | B60R 13/0206 296/146.7 |
| 2005/0011130 A1* | 1/2005 | Klippert | E05F 11/485 49/352 |
| 2007/0267889 A1* | 11/2007 | Flendrig | B60J 5/0416 296/202 |
| 2008/0222962 A1* | 9/2008 | Staser | E05F 11/488 49/502 |
| 2017/0274745 A1* | 9/2017 | Lewis | B60R 7/02 |
| 2017/0314306 A1* | 11/2017 | Fortin | B60J 5/0416 |
| 2019/0194205 A1 | 6/2019 | Duffy et al. | |

FOREIGN PATENT DOCUMENTS

| | | | |
|---|---|---|---|
| WO | 2019094673 A1 | 5/2019 | |
| WO | 2019118816 A1 | 6/2019 | |

\* cited by examiner

INTEGRATED WINDOW REGULATOR AND METHOD OF MAKING THE SAME

TECHNICAL FIELD

The present disclosure relates to a window regulator, such as an integrated window regulator, for use in motor vehicles.

BACKGROUND

Vehicles may include one or more windows that move between an open position and a closed position. The windows may be moved between the open position and the closed position by one or more devices such as a window regulator. Window regulators may include one or more guide rails that may be mounted next to an opening for the window. As one example, the window regulator may be disposed in a vehicle door cavity so that the window of the door may be actuated. Some window regulators may be attached to an inner door panel that may be attached to an exterior door panel.

The door panel may provide other functional benefits, such as providing strength to resist forces associated with a crash or provide mounting locations for one or more components, such as an audio speaker, a latch mechanism, or one or more motors configured to actuate the window regulator, or latch or both. As one example, an integrated window regulator may be integrally formed with the door panel.

SUMMARY

According to one embodiment, a window regulator for use in a motor vehicle is provided. The window regulator may be configured to move a window between a first position and a second position and may include a panel and a guide rail. The panel may define a speaker aperture that may be configured to receive at least a portion of the speaker. The guide rail may be integrally formed to the panel and configured to carry a slider. The slider may be configured to move along the guide rail to move the window between a first position and a second position. The guide rail may include an aperture-region portion that may extend across the speaker aperture in a first direction. The aperture-region portion may include a first sidewall and a second sidewall that may each extend in a second direction that may be substantially orthogonal to the first direction.

According to another embodiment, a window regulator for use in a motor vehicle and configured to move a window between a first position and a second position, is provided. The window regulator may include a panel and a guide rail. The panel may define a speaker aperture that may be configured to receive at least a portion of the speaker. A periphery of the speaker aperture may form a ring-shaped speaker ledge and an annular sidewall that may extend from an outer periphery of the speaker ledge. The guide rail may be integrally formed to the panel and be configured to carry a slider. The slider may be configured to move along the guide rail to move the window between the first position and the second position. The guide rail may include an aperture-region portion that may extend across the speaker aperture in a first direction. The aperture-region portion may include a first sidewall and a second sidewall that may each extend in a second direction that may be substantially orthogonal to the first direction. Portions of the first annular sidewall may circumferentially terminate at the first sidewall and the second sidewall.

According to yet another embodiment, a method of manufacturing a window regulator for use in a motor vehicle and configured to move a window between a first position and a second position, is provided. The window regulator may include a panel and a guide rail. The panel may define a speaker aperture that may be configured to receive at least a portion of the speaker. The guide rail may be integrally formed to the panel and configured to carry a slider. The slider may be configured to move along the guide rail to move the window between a first position and a second position. The guide rail may include an aperture-region portion that may extend across the speaker aperture in a first direction. The aperture-region portion may include a first sidewall, a second sidewall, and a connecting portion extending therebetween. The first and second sidewalls may each extend in a second direction that may be substantially orthogonal to the first direction. The method may include injecting liquid plastic material, by a first slide, into a cavity formed by a cavity die half and a core die half to form portions of the panel surrounding the speaker aperture, translating a vertical slider in the second direction into the speaker aperture to form the connecting portion, and translating a longitudinal slider in the first direction to form either the first sidewall or the second sidewall, or both.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

As used in the specification and the appended claims, the singular form "a," "an," and "the" comprise plural referents unless the context clearly indicates otherwise. For example, reference to a component in the singular is intended to comprise a plurality of components.

The term "substantially" or "about" may be used herein to describe disclosed or claimed embodiments. The term "substantially" or "about" may modify a value or relative characteristic disclosed or claimed in the present disclosure. In such instances, "substantially" or "about" may signify that the value or relative characteristic it modifies is within ±0%, 0.1%, 0.5%, 1%, 2%, 3%, 4%, 5% or 10% of the value or relative characteristic.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). The term "and/or" includes any and all combinations of one or more of the associated listed items.

The term "integrated window regulator" or "door module" may be used herein to describe disclosed or claimed embodiments. The term "integrated window regulator" may refer to a device configured to move a window of a vehicle, such as a window regulator, that includes guide rails formed to a panel that is attachable to an exterior panel of a vehicle, such as a vehicle door. The term "door module" may also refer to a device configured to move a window of a vehicle, such as a window regulator, that includes guide rails formed to a panel that is attachable to an exterior panel of a vehicle, such as a vehicle door. The term "door module" may refer to a device that is configured to receive various components, such as a speaker, latch, or other suitable components. Although the terms "integrated window regulator" or "window regulator" are used herein, the embodiments described or claimed herein may also apply to door modules and are not limited to window regulators.

Window regulators may include a pair of guide rails and a pair of sliders, each of which may travel along the guide rails to carry a window between one or more positions, such as opened or closed. To install the window to the sliders, a portion of the window may be inserted into one of the sliders and a second portion of the window may be inserted into the other slider. For assembly purposes, inserting and attaching the window to the sliders with a snap-in or force fit condition may be advantageous as compared to sliders that require additional securing operations. The distance between each of the sliders may be set by the distance between the guide rails. If the distance between the two sliders is too small, with respect to a length of the window, installing the window to the sliders may be challenging. If a sufficient distance between the guide rails is provided, the weight of the window may be more evenly distributed between the sliders. The even distribution of weight may prevent the glass from tipping during installation.

Because the length of a panel of the window regulator is generally constrained to a certain size, spacing the guide rails apart by a sufficient distance may not be possible. As provided in the present disclosure, extending one of the guide rails over a speaker aperture may resolve this issue. However, extending a guide rail over the speaker aperture may create its own challenges. As an example, in the region of speaker aperture the panel cannot directly support the guide rail. As such, the present disclosure provides one or more examples of how to the guide rail may be supported in this region to provide a required stiffness. Manufacturing by injection molding to provide sufficient structure to support the guide rail within the speaker aperture region may present its own challenges.

A known tool and method used to manufacture window regulators, including integrated window regulators is provided in DE Application No 10 2018 202 473 A1 and is hereby incorporated by reference in its entirety. An exemplary door module is provided in U.S. Pat. No. 10,603,990 and is hereby incorporated by reference in its entirety.

Referring generally to the figures, a window regulator, such as an integrated window regulator 100 is provided. The integrated window regulator 100 may be configured to move a window (not shown) between a first position, such as closed, to an open position, such as opened. The window regulator 100 may include a panel 102, that may include a first end 104 and a second end 106. The panel 102 may include a number of openings, recesses, or other features configured to receive one or more components when the window regulator is installed in a vehicle. As one example, the panel 102 may define a speaker aperture 110 that may be configured to receive a vehicle speaker 132.

The window regulator 100 may include a first guide rail 114 and a second guide rail 116. The first guide rail 114 and the second guide rail 116 may be integrally formed to the panel 102. As one example, the guide rails 114, 116 may be integrally formed by injection molding. As one example, as plastic material flows into a tool to form the panel, additional plastic material may flow to form the guide rails 114, 116. In one or more embodiments, only the second guide rail 116 may be integrally formed to the panel 102. At least a portion of the second guide rail 116 may extend over the speaker aperture 110.

The window regulator 100 may include a first slider 118 and a second slider 120. The first slider 118 and the second slider 120 may each be configured to receive and carry a window as the first slider 118 moves along the first guide rail 114 and as the second slider 120 moves along the second guide rail 116. The first slider 118 and the second slider 120 may each be configured to receive the window so that the window is attached to the sliders 118, 120 by a force-fit or snap-fit condition. The guide rails 114, 116 may be spaced apart by a sufficient distance such that the sliders 118, 120 engage the window by the force-fit or snap-fit condition.

The panel 102 of the window regulator 100 may include wet side 122 and a dry side 124. When the window regulator 100 is installed or assembled to a portion of the vehicle, such as a door 10, the wet side 122 may be arranged to face towards an exterior surface of the door 10 and the dry side 124 may be arranged to face an interior portion of the vehicle. An outer periphery 128 of the speaker aperture 110 may form a speaker ledge 154 that may be formed by a ring 130. The ring 130 may be formed on the dry side 124 of the panel 102 and may be configured to lie against a portion of a speaker 132 or a seal (not illustrated) disposed between the speaker and the ring 130, when the speaker 132 is assembled or installed to the panel 102. The ring 130 may include a first portion that may have a substantially planar shape that may provide a water-tight or water-resistant joint between the speaker 132 and the ring 130. Another portion 131 of the ring 130 may have a non-planar shape, that may be formed by a number of ribs 133.

The guide rail 116 may include an aperture-region portion extending across the speaker aperture in a first direction (z-direction). An aperture-region portion 134 may extend between second guide rail 116 and a peripheral portion 136 of the speaker aperture, that may be disposed on the wet-side 122 of the panel 102. The aperture-region portion 134 may include a number of sidewalls such as a first sidewall 138, a second sidewall 140, and a third sidewall 142. The first, second and third sidewalls, 138, 140, 142 may each extend from the second guide rail 116 to the peripheral portion 136. As one example, the second sidewall 140 and the third sidewall 142 may be spaced apart from one another to form a recess 144. The recess 144 may be sized to receive at least a portion, such as a magnet 146, of the speaker 132, when the speaker 132 is installed to the panel 102. The first sidewall 138 may be spaced apart from the second sidewall 140 and the third sidewall 142. A connecting portion 152 may extend between the first sidewall 138 and the second and third sidewalls 140, 142.

The second guide rail 116 may include a first edge 148 and a second edge 150. As one example, the first edge 148 may be formed or defined by the first sidewall 138. In one or more embodiments, the second sidewall 140, or the third sidewall 142, or both may be disposed between the first edge 148 and the second edge 150. The second slider 120 may engage and translate along the second edge 150 of the second guide rail 116.

Figure 1:
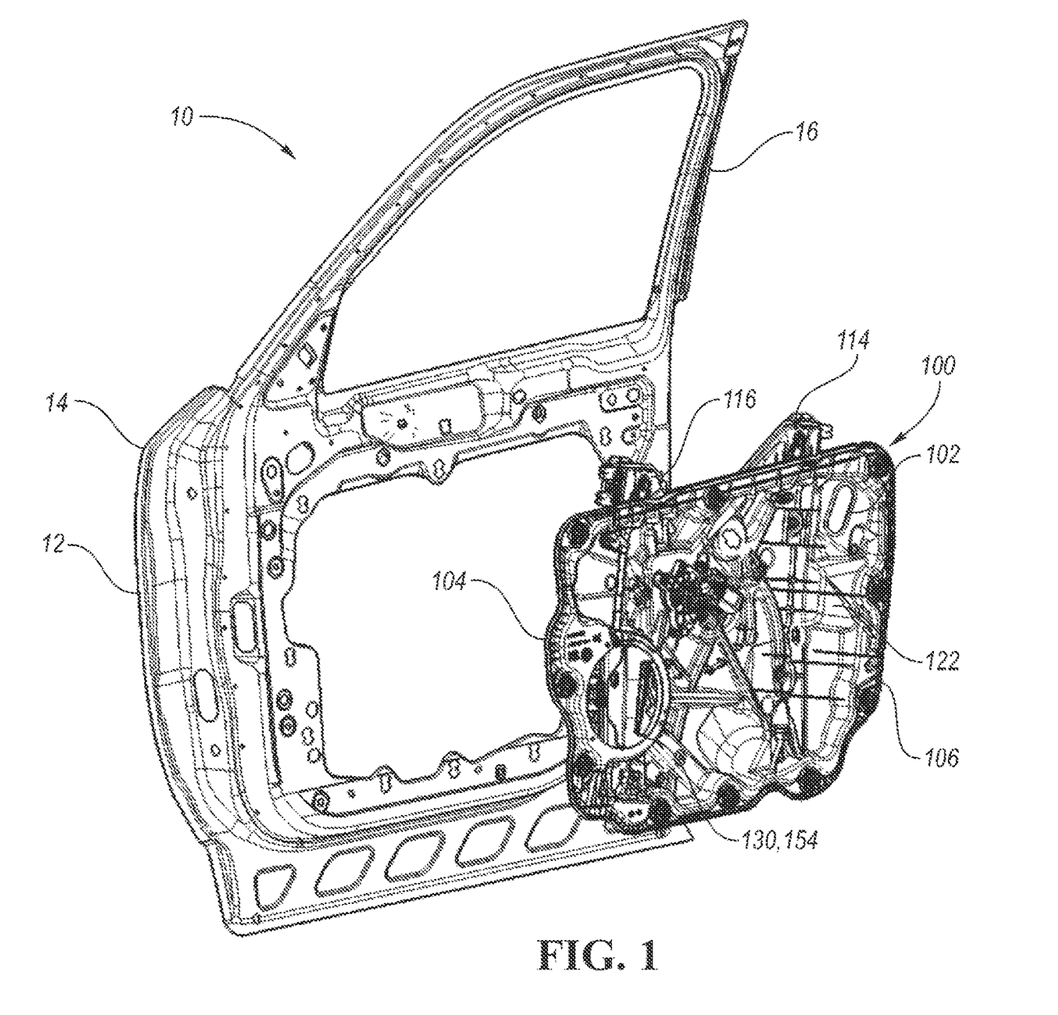
FIG. 1 illustrates a perspective-exploded view of an exemplary vehicle door and an exemplary window regulator.

FIG. 1 illustrates a perspective-exploded view of an exemplary vehicle door 10 and the window regulator 100 according to one or more embodiments. The vehicle door 10 may include an exterior panel 12 that may be arranged to receive the window regulator 100. The wet side 122 of the window regulator 100 may be arranged to face towards the exterior panel 12 and the dry side 124 of the window regulator 100 may be arranged to face an opposite direction. As described above, the speaker ledge 154 formed by the ring 130 surrounding the speaker aperture 110 may be formed on the dry side 124 of the window regulator 100. The first and second guide rails 114, 116 may extend from the wet side 122 of the window regulator 100.

While the ring 130 is illustrated as circular, the speaker aperture 110 and the ring 130 may have another shape.

The vehicle door may include 10 include a first end 14 and a second end 16. When the vehicle door 10 is assembled to a vehicle body (not illustrated) the first end 14 may be positioned adjacent to a medial portion of the vehicle body, such as a B-pillar and the second end may be positioned adjacent to an A-pillar of the vehicle. When window regulator is assembled to the vehicle door 10, the first end 104 of the panel 102 may be positioned closer to the first end 14 of the door and the second end 106 may be positioned closer to the second end 16 of the vehicle door 10.

Figure 2:
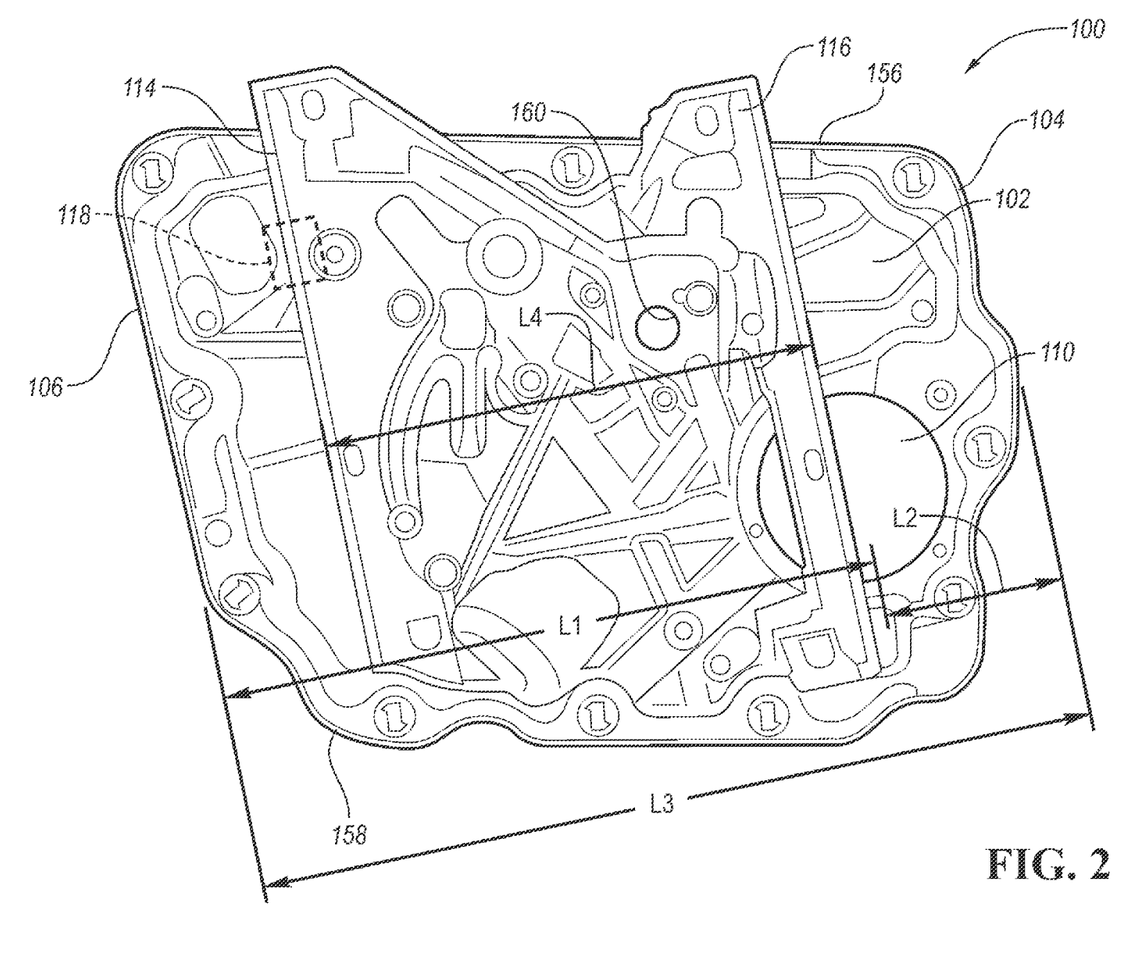
FIG. 2 illustrates a plan view of an exemplary window regulator.

FIG. 2 illustrates the plan view of the window regulator 100. The panel 102 may include a top edge 156 and a lower edge 158. As one example, the first guide rail 114, or the second guide rail 116, or both may extend past the top edge 156, the lower edge 158 or both. The panel 102 may define a motor aperture 160 that may be configured to receive a motor, a gearbox, and a cable drum housing 162.

In one or more embodiments, the speaker aperture 110 may be spaced apart from the first end 104 by a first distance L1 and from the second end 106 by a second distance L2, that may be less than the first distance L1. The first end 104 and the second end 106 may be spaced apart from one another by a third distance L3. The first guide rail 114 and the second guide rail 116 may be spaced apart from one another by a fourth distance L4.

In one or more embodiments, first distance L1 may range from 277 mm to 820 mm, the second distance L2 may range from 80 mm to 241 mm, the third distance L3 may range from 355 mm to 1072 mm, and the fourth distance L4 may range from 210 mm to 630 mm.

Figure 3:
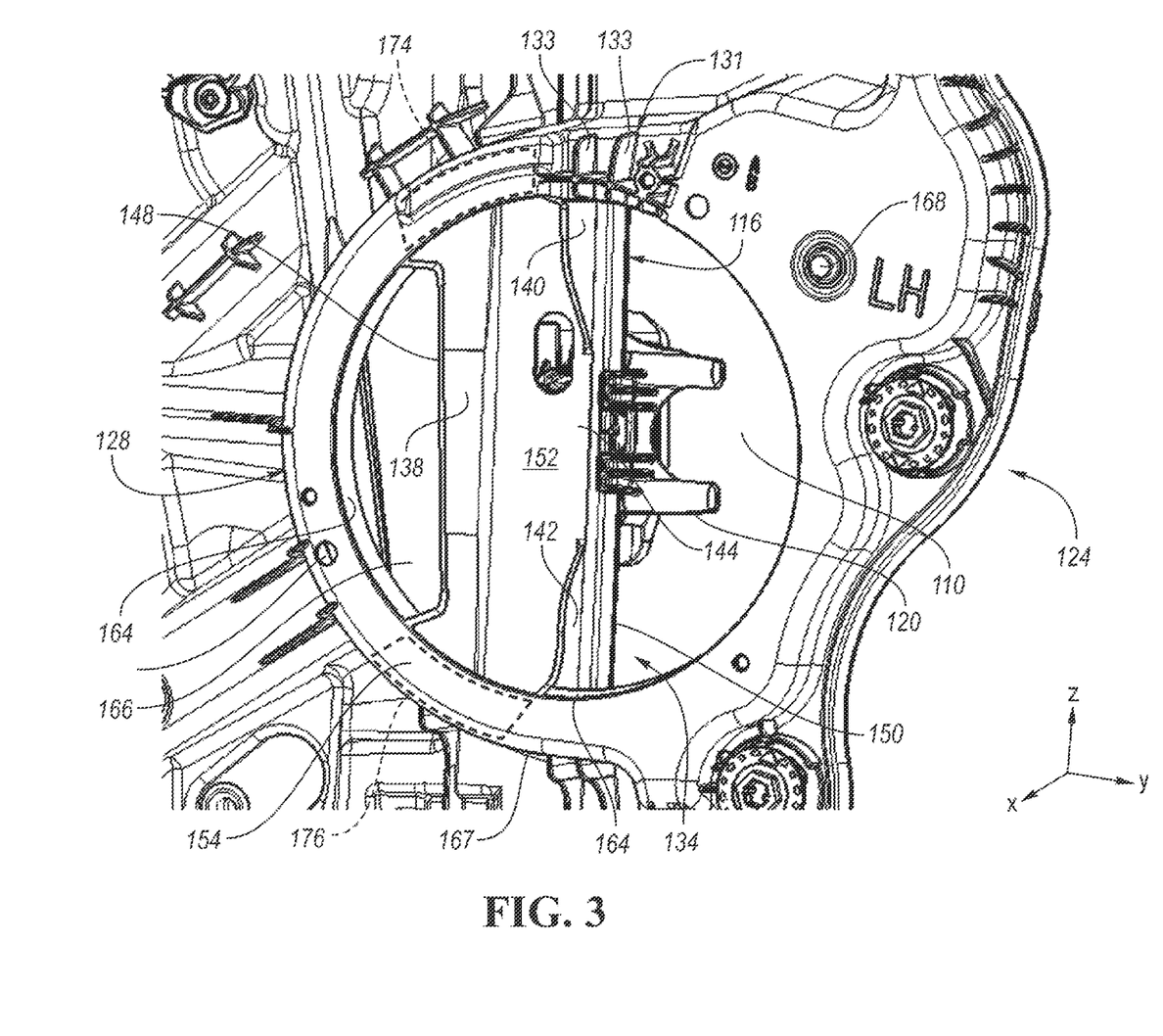
FIG. 3 illustrates a partial-perspective view of a first side of an exemplary window regulator.

FIG. 3 illustrates a partial-perspective view of the dry side 124 of the window regulator 100. As mentioned above, the second guide rail 116 extends over the speaker aperture 110. The second guide rail 116 includes the edge 150 and the second slider 120 may move along the second edge 150. The speaker ledge 154 may be formed by the ring 130 surrounding the speaker aperture and forming the planar portion of the ring 130. An inner peripheral 164 may extend in an axial direction from the ring 130. The inner peripheral wall 164 may define a diameter that may be configured to receive one or more portions of the speaker 132.

The inner peripheral wall 164 may extend between a first portion of the first sidewall 138 and a second portion of the first sidewall. Moreover, the inner peripheral wall may extend between the second sidewall 140 and the third sidewall 142. The connection between inner peripheral wall 164 and the sidewalls 138, 140, 142 may be configured to enhance stiffness of the aperture region portion 134.

An outer peripheral wall 167 may extend in the axial direction from the ring 130 to the wet side 122 of the panel 102. As an example, one or more of the sidewalls 138, 140, 142 may extend to the outer peripheral wall 167 in the z-direction and may extend to the ring 130 in the x-direction. The first sidewall 138, a second sidewall 140, a portion of the ring 130, and a portion of the outer peripheral wall 167 may form a first recessed pocket 174. The first sidewall 138, the third sidewall 142, a portion of the ring 130, and a portion of the outer peripheral wall 167 may form a second recessed pocket 176. The first and second recessed pockets 174, 176 may provide tooling access so that one or more plastic injection tools may form the sidewalls 138, 140, 142 to support the ring 130.

The non-planar portion 131 of the ring 130 may be formed by one or more ribs 133. As one example, a number of the ribs 133 may extend in a radial direction. One or more fastener apertures 166 may be defined by the ring 130. A number of the fastener apertures 166 may be configured to receive a number of fasteners (not illustrated) that may attach the speaker 132 to the panel 102.

An injector point 168 may be provided on the dry side 124 of the panel 102. The injector point 168 may be formed by a protrusion that is spaced apart from the speaker aperture 110. The injector point 168 may be positioned such that plastic material may flow in a suitable manner for injection molding.

Figure 4:
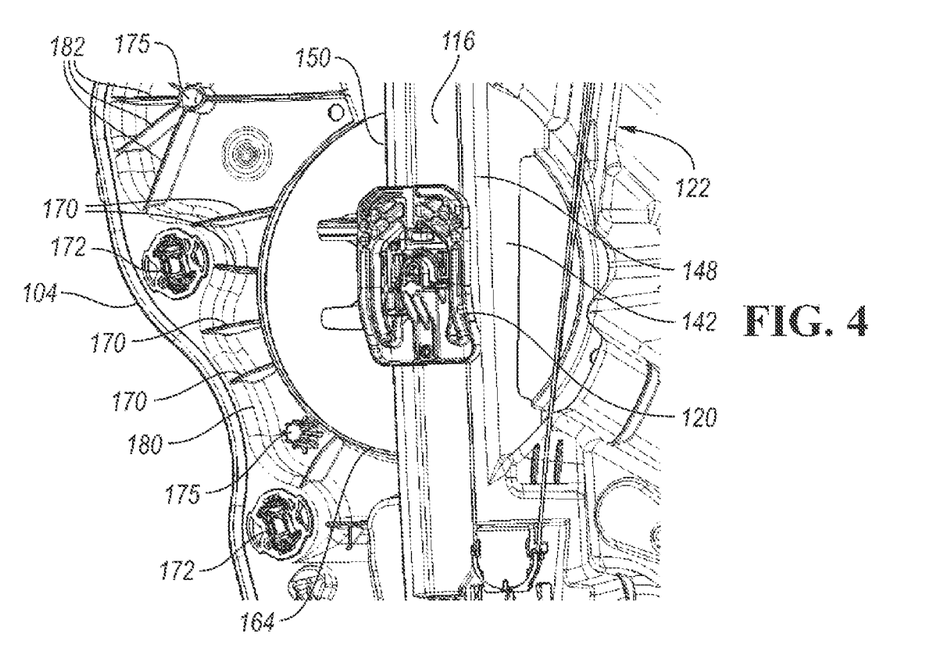
FIG. 4 illustrates a partial-perspective view of a second side of an exemplary window regulator.

FIG. 4 illustrates a partial-perspective view of the wet side 122 of the window regulator 100. The panel 102 may define one or more mounting apertures 172 that may be configured to receive a fastener to attach the window regulator 100 to the vehicle door. As one example, the mounting apertures may be referred to as "bayonet openings." The panel 102 may define a peripheral rib 180 that may be spaced apart from the first end 104 of the panel. The mounting apertures 172 may be disposed between the first end 104 and the peripheral rib 180.

In one or more embodiments, the panel 102 may include a number of supporting ribs 170 that may be configured to provide a relatively stiff structure surrounding the speaker aperture 110. Because the second guide rail 116 extends across the speaker aperture 110 and extends from a periphery of the speaker aperture 110, the surrounding portion may be sufficiently stiff to prevent flexing or bowing of the second guide rail 116. The supporting ribs 170 may extend between the peripheral wall 164 and the peripheral rib 180.

As one example, the supporting ribs 170 may extend in a substantially radial direction with respect to the speaker aperture 110.

In one or more embodiments, the panel 102 may include one or more stiffening ribs 182. One or more of the stiffening ribs 182 may extend from the peripheral rib 180 to a protrusion 175. The protrusion 175 may define a recess or define a hollow space such that plastic material may flow from the protrusion 175 to form the stiffening ribs 182.

Figure 5:
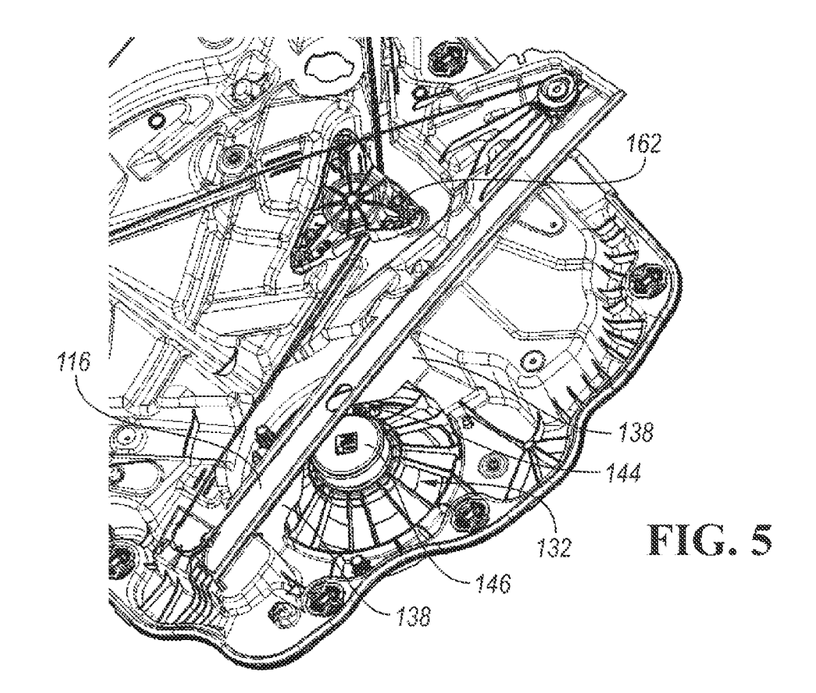
FIG. 5 illustrates a partial-perspective view of a second side of an exemplary window regulator including a speaker.

FIG. 5 illustrates a partial-perspective view of the wet side 122 of the panel including the speaker 132. The window regulator 100 may be provided with a cable drum housing 162 that may be configured to route cables that carry the slider 120 (FIG. 4). The first sidewall 138 may extend from the guide rail 116 to the panel 102 and may define a recess 144. The recess 144 may be sized to receive a portion, such as the magnet 146 of the speaker 132.

Figure 6:
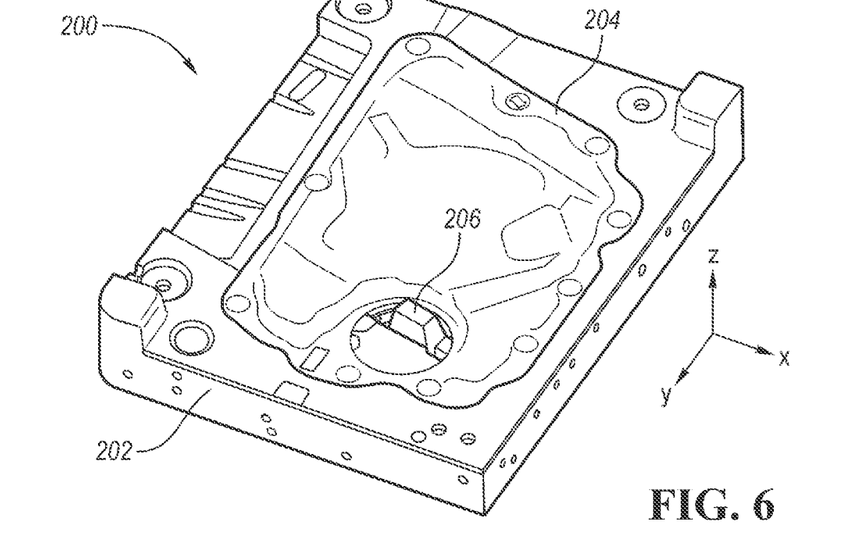
FIG. 6 illustrates a partial-perspective view of an exemplary core-side die half.
Figure 7:
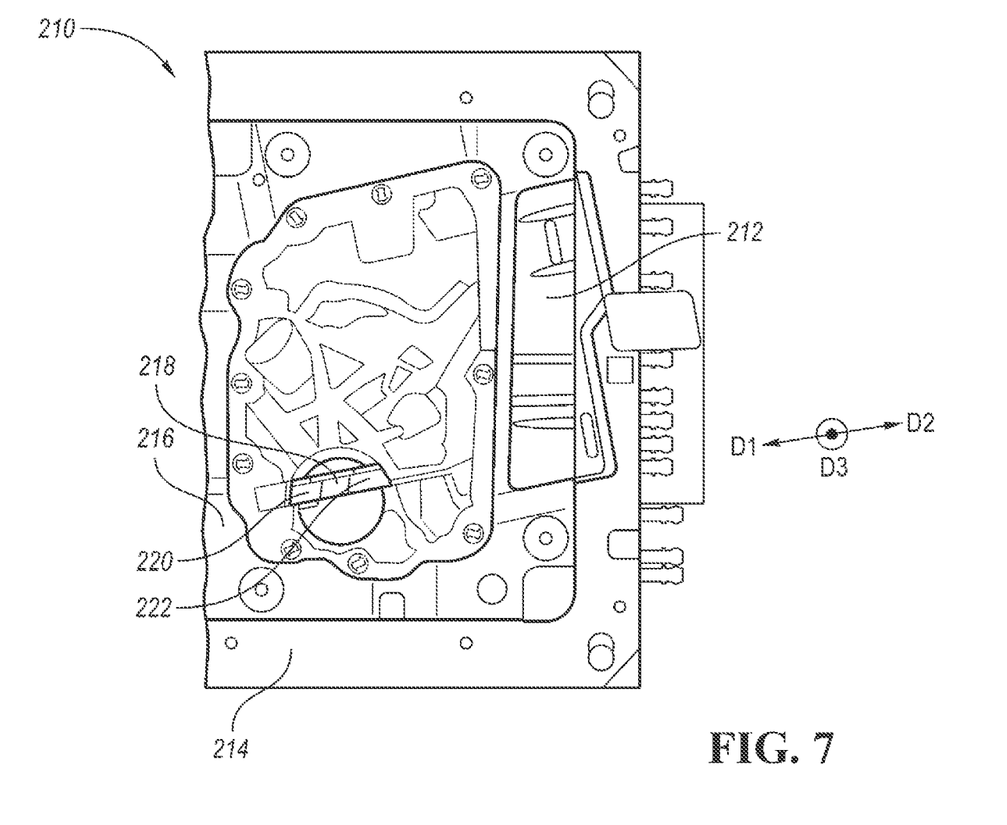
FIG. 7 illustrates a partial-top view of an exemplary cavity-side die half.

FIG. 6 and FIG. 7 illustrate a partial-perspective view of a die half, such as a core-side die half 200 and a top view of another die half, such as a cavity-side die half 210, respectively. The core-side die half 200 may include a support plate 202 that includes a core insert 204. The core insert 204 may include a core block 206. As heated liquid plastic is injected into the dies 200, 210, it may surround the core block 206 to form portions of aperture-region portion 134 of the guide rail 116. The cavity-side die half 210 may include a cavity support plate 214 that may include a cavity insert 216. A slide 212 may be disposed near a top portion of the cavity insert and may be configured to provide a portion of the heated liquid plastic to dies 200, 210 to form portions of the panel 102 that surround the speaker aperture 110 (see FIG. 3).

The cavity-side die half 210 may include a vertical slider 218 and one or more longitudinal sliders 220, 222. The vertical slider may translate in a vertical direction, normal to a viewer of FIG. 7, and provide a predetermined amount of heated liquid plastic to form portions of the aperture-region portion 134, such as the connecting portion 152. The first longitudinal slider 220 may translate along a direction D1 and the second longitudinal slider 222 may translate along a second direction D2 to provide a predetermined amount of heated liquid plastic to form the sidewalls 138, 140, 142.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

PARTS LIST

The following is a list of reference numbers shown in the Figures. However, it should be understood that the use of these terms is for illustrative purposes only with respect to one embodiment. And, use of reference numbers correlating a certain term that is both illustrated in the Figures and present in the claims is not intended to limit the claims to only cover the illustrated embodiment.

10 vehicle door
12 exterior panel
14 first end
16 second end
100 window regulator
102 panel
104 first end
106 second end
110 speaker aperture
114 first guide rail
116 second guide rail
118 first slider
120 second slider
122 wet side
124 dry side
128 outer periphery
130 ring
131 non-planar portion
132 speaker
133 ribs
134 support member
136 peripheral portion
138 first sidewall
140 second sidewall
142 third sidewall
144 recess
146 magnet
148 first edge
150 second edge
152 connecting portion
154 speaker ledge
156 top edge
158 edge
160 motor aperture
162 cable drum housing
164 annular peripheral wall
166 aperture
168 injector point
170 supporting ribs
172 mounting apertures
174 recessed pocket
175 protrusion
176 recessed pocket
180 peripheral rib
182 stiffening ribs
200 core-side die half
202 support plate
204 core insert
206 core block
210 cavity-side die half
212 slide
214 cavity support plate
216 cavity insert
218 vertical slider
220 first longitudinal slider
222 second longitudinal slider

What is claimed is:

1. A window regulator for use in a motor vehicle and configured to move a window between a first position and a second position, the window regulator comprising:
a monolithic panel defining a speaker aperture configured to receive at least a portion of a speaker and defining a guide rail configured to carry a window slider, wherein the slider is configured to move along the guide rail to move the window between the first position and the second position, wherein the guide rail includes an aperture-region portion extending across the speaker aperture in a first direction, wherein the aperture-region portion includes a first sidewall and a second sidewall each extending in a second direction substantially orthogonal to the first direction.

2. The window regulator of claim 1, wherein the guide rail includes a first edge and a second edge, wherein the second sidewall is disposed between the first edge and the second edge.

3. The window regulator of claim 2, wherein the first sidewall forms the first edge.

4. The window regulator of claim 1, wherein panel includes a wet side and a dry side, wherein when the window regulator is installed in the motor vehicle, the dry side is arranged to face towards an interior of the motor vehicle, wherein at least a portion of an outer periphery of the speaker aperture, disposed on the dry side of the panel, forms a ring configured to lie against a portion of the speaker or a seal disposed between the portion and the ring when the speaker is installed to the panel.

5. The window regulator of claim 4, further comprising a wet-side annular sidewall extending in the second direction from the wet side of the panel around the speaker aperture, wherein the wet-side annular sidewall in conjunction with the first and second sidewalls are configured to enhance stiffness of the aperture region portion.

6. The window regulator of claim 5, wherein the aperture-region portion includes a third sidewall, wherein the second sidewall and the third sidewall are spaced apart from one another to form a recess, wherein the recess is sized to receive at least a portion of the speaker when the speaker is installed to the panel.

7. The window regulator of claim 6, wherein a first portion of the ring, the first sidewall, and the second sidewall form a recessed pocket.

8. The window regulator of claim 7, wherein a second portion of the ring, the first sidewall, and the third sidewall form a second recessed pocket.

9. The window regulator of claim 4, further comprising a dry-side annular sidewall extending in the second direction from a portion of an inner periphery of the ring.

10. The window regulator of claim 9, wherein the dry-side annular sidewall extends between a first portion of the first sidewall and a second portion of the first sidewall.

11. The window regulator of claim 10, wherein the dry-side annular sidewall includes a free edge, spaced apart from the ring, wherein the free edge is spaced apart from a third portion of the first sidewall disposed between the first and second portions.

12. A window regulator for use in a motor vehicle and configured to move a window between a first position and a second position, the window regulator comprising:
a panel defining a speaker aperture configured to receive at least a portion of a speaker, wherein a periphery of the speaker aperture forms a ring-shaped speaker ledge and an annular sidewall extending from an outer periphery of the speaker ledge; and
a guide rail integrally formed to the panel and configured to carry a slider, wherein the slider is configured to move along the guide rail to move the window between the first position and the second position, wherein the guide rail includes an aperture-region portion, extending across the speaker aperture in a first direction, and provided with a first sidewall and a second sidewall each extending in a second direction, substantially orthogonal to the first direction, and wherein portions of the annular sidewall circumferentially terminate at the first sidewall and the second sidewall.

13. The window regulator of claim 12, wherein a first portion of the ring-shaped speaker ledge is formed by a substantially planar member configured to lie against the speaker and extending from the annular sidewall.

14. The window regulator of claim 13, wherein a second portion of the ring-shaped speaker ledge is formed by a first rib extending radially from an inner periphery of the ring-shaped speaker ledge.

15. The window regulator of claim 14, wherein the second portion includes a boss defining an aperture or a recess, each configured to receive a fastener configured to attach the speaker to the ring-shaped speaker ledge.

16. The window regulator of claim 14, wherein the second sidewall is tapered between the ring-shaped speaker ledge and the guide rail.

17. The window regulator of claim 13, wherein the panel includes a first end and a peripheral rib disposed between the first end and the speaker aperture.

18. The window regulator of claim 17, further comprising a plurality of supporting ribs extending between an inner periphery of the speaker aperture and the peripheral rib or the first end.

19. The window regulator of claim 12, further comprising a second sidewall and a third sidewall each extending between the ring-shaped speaker ledge and the guide rail.

20. A window regulator for use in a motor vehicle and configured to move a window between a first position and a second position, the window regulator comprising:
a panel defining a speaker aperture configured to receive at least a portion of a speaker; and
a guide rail integrally formed to the panel and configured to carry a slider, wherein the slider is configured to move along the guide rail to move the window between the first position and the second position, wherein the guide rail includes an aperture-region portion extending across the speaker aperture in a first direction and having a sidewall attached to a periphery of the speaker aperture, wherein the sidewall defines a recess configured to partially receive a speaker.

* * * * *